United States Patent
Koenig et al.

(10) Patent No.: US 8,954,330 B2
(45) Date of Patent: Feb. 10, 2015

(54) CONTEXT-AWARE INTERACTION SYSTEM USING A SEMANTIC MODEL

(75) Inventors: Michael F. Koenig, Bellevue, WA (US); Oscar Enrique Murillo, Redmond, WA (US); Ira Lynn Snyder, Jr., Bellevue, WA (US); Andrew D. Wilson, Seattle, WA (US); Kenneth P. Hinckley, Redmond, WA (US); Ali M. Vassigh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 243 days.

(21) Appl. No.: 13/305,429

(22) Filed: Nov. 28, 2011

(65) Prior Publication Data

US 2013/0138424 A1    May 30, 2013

(51) Int. Cl.
*G10L 21/10* (2013.01)
*G06F 17/27* (2006.01)
*G10L 21/00* (2013.01)

(52) U.S. Cl.
CPC .............. *G10L 21/10* (2013.01); *G06F 17/27* (2013.01); *G10L 21/00* (2013.01)
USPC .......................................................... 704/270

(58) Field of Classification Search
CPC ................................ G06F 17/27; G10L 21/10
USPC .......................................................... 704/270
See application file for complete search history.

(56) References Cited

U.S. PATENT DOCUMENTS

| | | | |
|---|---|---|---|
| 6,570,555 B1 * | 5/2003 | Prevost et al. ................ | 345/156 |
| 7,188,067 B2 * | 3/2007 | Grant et al. .................... | 704/275 |
| 7,216,351 B1 * | 5/2007 | Maes ............................. | 719/328 |
| 7,295,975 B1 | 11/2007 | Bangalore et al. | |
| 7,447,638 B1 * | 11/2008 | Grant et al. .................... | 704/275 |
| 7,562,019 B2 * | 7/2009 | Cohen et al. ................... | 704/270 |
| 7,679,612 B2 * | 3/2010 | Milirud et al. ................ | 345/204 |
| 7,680,816 B2 * | 3/2010 | Sharma ......................... | 707/781 |
| 7,706,785 B2 * | 4/2010 | Lei et al. .................... | 455/414.4 |
| 7,774,713 B2 | 8/2010 | Mital et al. | |
| 7,823,089 B2 | 10/2010 | Wilson | |
| 7,898,533 B2 * | 3/2011 | Milirud et al. ................ | 345/204 |
| 7,899,915 B2 * | 3/2011 | Reisman ....................... | 709/228 |
| 7,903,045 B2 * | 3/2011 | Milirud et al. ................ | 345/1.1 |
| 7,987,491 B2 * | 7/2011 | Reisman ....................... | 725/112 |
| 8,000,974 B2 * | 8/2011 | Grant et al. .................... | 704/275 |

(Continued)

OTHER PUBLICATIONS

Schmidt, et al., "Toward Disambiguating Multiple Selections for Frustum-Based Pointing", Retrieved at <<http://www.dtic.mil/cgi-bin/GetTRDoc?AD=ADA507388&Location=U2&doc=GetTRDoc.pdf>>, Mar. 25-29, 2006, 10 pages.

Kaiser, et al., "Mutual Disambiguation of 3D Multimodal Interaction in Augmented and Virtual Reality", Retrieved at <<http://www.hrvoje.benkofamily.net/publications/2003/p128-kaiser.pdf>>, ICM-PUI '03, Nov. 5-7, 2003, Vancouver, BC, 8 pages.

(Continued)

*Primary Examiner* — Susan McFadden
(74) *Attorney, Agent, or Firm* — Heikki Einola; Leonard Smith; Micky Minhas

(57) ABSTRACT

The subject disclosure is directed towards detecting symbolic activity within a given environment using a context-dependent grammar. In response to receiving sets of input data corresponding to one or more input modalities, a context-aware interactive system processes a model associated with interpreting the symbolic activity using context data for the given environment. Based on the model, related sets of input data are determined. The context-aware interactive system uses the input data to interpret user intent with respect to the input and thereby, identify one or more commands for a target output mechanism.

20 Claims, 7 Drawing Sheets

(56) References Cited

U.S. PATENT DOCUMENTS

| | | |
|---|---|---|
| 8,161,172 B2 * | 4/2012 | Reisman .................. 709/228 |
| 8,175,883 B2 * | 5/2012 | Grant et al. ................ 704/270 |
| 8,433,731 B2 * | 4/2013 | Johnston et al. ............ 707/803 |
| 2006/0143576 A1 | 6/2006 | Gupta et al. |
| 2010/0241431 A1 | 9/2010 | Weng et al. |

OTHER PUBLICATIONS

Irawati, "Move the Couch Where?": Developing an Augmented Reality Multimodal Interface, Retrieved at <<http://citeseerx.ist.psu.edu/viewdoc/download?doi=10.1.1.101.2511&rep=rep1&type=pdf>>, Oct. 22-25, 2006, 4 pages.

* cited by examiner

CONTEXT-AWARE INTERACTION SYSTEM USING A SEMANTIC MODEL

BACKGROUND

Handwriting, gesturing, drawing, facial expressions, body/facial orientation (e.g., vision) and speech are typical communication modes between human beings. Various computing devices (e.g., a camera/display device for recording and playing a message, a mobile phone for calling another phone, an email system for communicating electronic mail and/or the like) provide a user with different interface systems for interacting with other humans in one or more of these modes. Some interface systems may support multiple communication modes (e.g., multimodal), such as a mobile phone capable of sending voice and video data simultaneously.

A common interface system combines a visual modality mechanism (e.g. a display for output and a keyboard and mouse for input) with a voice modality mechanism (e.g., speech recognition for input and a speaker for output), but other modality mechanisms, such as pen-based input, also may be supported. These interface systems limit the interaction between humans to a certain number of mechanisms for providing an input modality and receiving an output modality. In order to send an e-mail, for example, the user needs to use the voice modality mechanism and/or the visual modality mechanism.

An increasing number of existing computing device interface systems are able to support other communication modes and additional interaction mechanisms. The existing computing device interface systems, for instance, may be implemented in contemporary gaming consoles in order to detect user movements and interpret these movements as game input. For example, the Kinect™ for MICROSOFT Xbox 360® uses video (i.e., camera) and audio (i.e., a voice recorder) technology to sense the user movements without the need for a controller.

While motion detection and multimodal interface systems are well-known concepts in human-computer interaction (HCI), current research and technology have numerous shortcomings. For example, existing interface systems continue to inaccurately interpret the user intent with respect to complex input, such as facial expressions, gestures and/or speech.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a context-aware interactive system using a semantic model. In one aspect, the context-aware interactive system enables multimodal semantic model integration across different environments by adapting a grammar structure using context. In another aspect, the context-aware interactive system facilitates collaborative work within a shared work space in which human users interact with various physical objects and/or virtual objects. The context-aware interactive system may be employed in various environments, such as meeting/conference rooms as well as laboratories, offices, reception areas, retail environments, medical environments (e.g., operating rooms, emergency rooms, consultation rooms and/or the like), network operations centers, control rooms and/or the like.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a content-aware interactive system using a semantic model. In one exemplary implementation, such a system uses context data and/or historical data associated with a given environment to define context-dependent grammar for interpreting symbolic activity by human users. By sensing the environment and creating profiles describing physical objects and/or virtual objects, the context-aware interaction system builds the context-dependent grammar. For example, the context-aware interactive system may enhance a conventional collaborative work space via the context-dependent grammar, which enables direct interaction between the users and the virtual objects (e.g., projected documents on screens, data files) as well as the physical objects (e.g., a speaker phone, a projector, white board pens, erasers, office supplies and/or the like).

In one exemplary implementation, the context-aware interactive system builds a semantic model using a context-dependent grammar and employs such a model to determine user-intended meanings of modal input or multimodal input for various output mechanisms. The context-aware interactive system may use any number of sensors (e.g., microphones, video and depth cameras, accelerometers, gyroscopes, magnetometers (digital compasses), barometers and/or the like) to capture the multimodal input from the one or more users (or devices held or otherwise carried or manipulated by users) and recognize body movements, gestures and/or facial expressions. The context-aware interactive system may use microphone arrays for speech input, touch surfaces for touch and pen stylus inputs, and ambient sensors (e.g., location aware sensors, temperature, time, and so forth). The context-aware interactive system uses the semantic model to interpret symbolic activity by the users and identify one or more corresponding commands for a target output mechanism. The symbolic activity may include modal input or a combination of various multimodal inputs.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and input processing to determine user intent in general.

Figure 1:
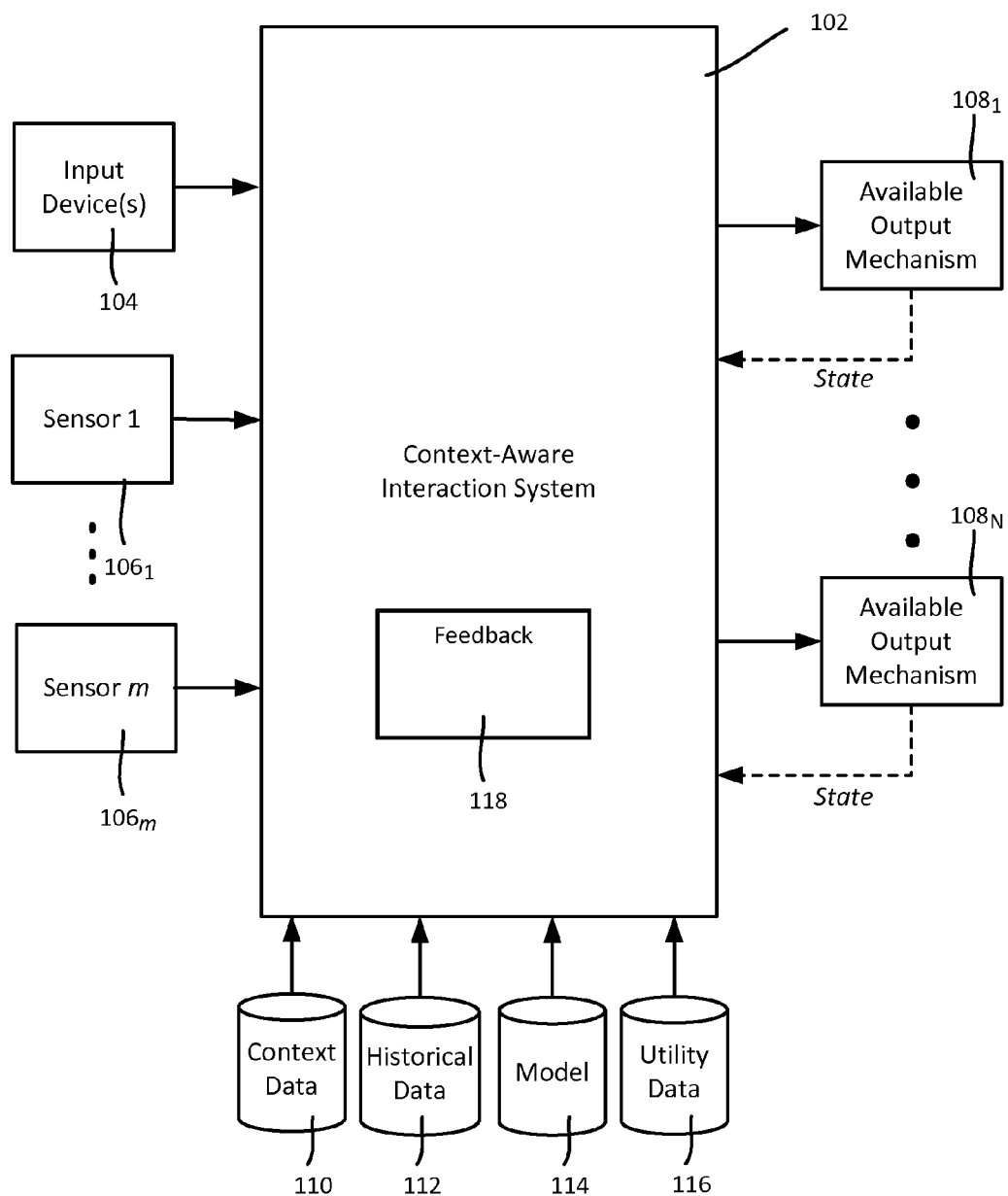
FIG. 1 is a block diagram illustrating exemplary components a context-aware interaction system according to one example implementation.

FIG. 1 is a block diagram illustrating exemplary components a context-aware interaction system 102 according to one example implementation. User input data may be entered into the context-aware interaction system 102 through one or more input devices 104, such as a tablet, electronic digitizer, a microphone, a camera, a depth camera, a keyboard and pointing device, commonly referred to as mouse, trackball or touch pad. Other embodiments of the one or more input devices 104 may include a joystick, game pad, and any other wireless or wired controller. Each of the one or more input devices 104 may be physically attached to the context-aware interactive system 102 or remotely located, and, for example, may be synthesized as if coming from an input device but actually coming from a different (e.g., remote) computer system of another user. Note that the one or more input devices 104 may be operated by one user or a plurality of users within a given environment.

A combination of the one or more input devices 104 and a plurality of sensors $106_1$-$106_m$ provide sets of input data from one or more modalities to the context-aware interaction system 102. The sensors $106_1$-$106_m$ may also provide environmental data and/or other sensed data to the context-aware interaction system 102. More particularly, the sensors $106_1$-$106_m$ have the ability to gather detailed information about a physical environment and the user or users interacting with the context-aware interaction system 102. In one exemplary implementation, the sensors $106_1$-$106_m$ may be capable of providing detailed information about a remote user that the context-aware interaction system 102 uses to create an avatar representing the remote user for display within the physical environment. The context-aware interaction 102 may characterize the avatar as another virtual object with which other users interact. Alternatively, the sensors $106_1$-$106_m$ may project the detailed information about each user onto a virtual environment (e.g., a virtual collaborative space).

Examples of the sensors $106_1$-$106_m$ include computer vision devices, microphones, accelerometers, gyroscopes, magnetometers, compasses, clocks, Global Positioning System (GPS) devices, thermometers, humidity sensors, light sensors, infrared sensors, signal strengths of nearby devices, access points, or other transmitters, depth sensors and/or the like. These sensors can sense environmental and other data, such as current room and/or device temperature, whether the user is moving and at what speed, whether the user is alone or with someone else, the amount of ambient light, computer-related or output device-related data (e.g., device battery life, available power, running programs and services), and so forth.

In general and as described herein, the context-aware interaction system 102 interprets symbolic activity by determining intent/intended meaning of the input from the user or users and translates the symbolic activity into output in the form of actionable commands to an available output mechanism 108. Note that an example output mechanism 108 may be any operating system component, application and so forth running on a computing device. In one alternative, the example output mechanism 108 may implement its own multimodal interface; for example, a suite of applications, such as MICROSOFT® Office, may be provided that incorporates a multimodal interface. In another alternative, the context-aware interaction system 102 may be a component of a larger intention judgment system, or work in conjunction with a larger intention engine.

In one exemplary implementation, context data 110 indicates various information, such as which devices (e.g., as a computer, a visual display, a game console and/or the like) are currently present in a physical environment, a type of each device, a specific purpose or purposes that the physical environment serves and/or which users are participating in such a purpose. The context data 110 may also include information that describes various virtual objects being manipulated within the present environment, such as shared documents, presentations and/or running programs (e.g., common software applications). In another exemplary implementation, the context data 110 may also include profiles for known users of the present physical environment.

In addition, the context data 110 may also include a geometric representation (e.g., a three-dimensional model) of the physical environment depicting locations of each user, each physical object and/or each virtual object. The context data 110 may also include distances and/or relative body orientations (i.e. difference in canonical front-facing orientations) between two or more users and/or a user and a physical object, which may be used to infer how the users interact with each other and/or interact with the physical object. Such an inference may be used to develop a grammar rule for interpreting symbolic activity performed by one user and directed to another user or the physical object.

Furthermore, the context data 110 may include various environment-related data and/or other sensed data produced by the sensors $106_1$-$106_m$. The context-aware interaction system 102 may employ various mechanisms for analyzing the context data 110, such as natural language processing including entity extraction (e.g., locating and classifying atomic elements in text into predefined categories of nouns, such as people names, places names, object names and/or the like) and/or speech processing, proxemics, computation linguistics, data mining techniques, semantic modeling techniques and/or the like.

In one exemplary implementation, historical data 112 may be input into the context-aware interaction system, such as records detailing the interpreted intent of previous multimodal inputs by users in the given environment. The historical data 112 may include past conversations between participants of a presentation or a meeting and/or past interactions with the context-aware interactive system 102. Within environments comprising three-dimensional immersion environments, the context-aware interactive system 102 may solve various interpretation issues, such as a user's imprecise pointing at a distant object, the user's selection of occluded/hidden physical and/or virtual objects, and speech recognition errors, by compensating for errors in some input modalities using the historical data 112.

In one exemplary implementation, the user intent behind a symbolic activity, as well as what is considered input versus what is not may be based on a vocabulary within a model 114 that comprises various input modal dictionaries. For example, each vocabulary entry may include one or more input events defined by a speech dictionary, gesture dictionary, a physical/ virtual object dictionary, handwriting dictionary, command and control library, and/or the like as well as one or more combined dictionaries (e.g., what various gestures mean when accompanied by speech or a facial expression). The dictionaries may be trained from the context data 110 and/or other known data. For example, the gesture dictionary may be trained from general users and/or custom trained for a specific user, and may be predefined in whole or in part, such as a command and control library that recognizes only specific commands.

The model 114 may reside on the computer system that hosts the context-aware interaction system 102, in a remote computer system or systems ("cloud"), and/or one of the input devices 104. In one exemplary implementation, the model 114 may incorporate a probabilistic semantic model that specifies a likelihood of each input event within the vocabulary occurring within the given environment. In one exemplary implementation, the context-aware interactive system 102 creates the vocabulary for the model 114 by defining a content-dependent grammar (structure). One general purpose of the context-dependent grammar is to capture syntactic input events in relation to their semantics.

In one exemplary implementation, the context-aware interactive system 102 builds the vocabulary as a semantic data model that is implemented specifically for a given environment. The context-aware interactive system 102 may parse modal or multimodal input events into discrete input elements. For example, the hand gesture may be decomposed into one or more components, such as a starting point, a trajectory of an intermediate movement and an ending point. Using a meaning of each component and an interrelation between components, the context-aware interactive system determines a composite meaning of the hand gesture, which is stored in the model 114. In one exemplary implementation, the context-aware interaction system 102 may classify the hand gesture components as an embodiment of symbolic activity, such as displaying a virtual object at the starting point on a projector at the ending point. As another example, when the hand gesture is combined with speech, meanings of each spoken word/phrase may be correlated with meanings of each gesture component to form a meaning for the multimodal input event.

When building the vocabulary for the model 114, the context-aware interaction system 102 may define and/or update the context-dependent grammar by continuously recognizing patterns within the given environment. Each pattern may refer to one or more input events from one or more input modalities. The context-aware interaction system 102 may determine that two or more input elements form an input event using various well-known techniques, such as computer vision, machine learning, statistical language processing and/or the like, according to one exemplary implementation. Exemplary statistical language processing techniques include N-gram modeling (e.g., trigram or bigram modeling), which may predict a likelihood of encountering an input element based on one or more preceding input elements. A trigram model may be used to conceptualize a speech phrase having three or more words based on the first two words.

In another exemplary implementation, exemplary machine learning techniques, such as a classification, clustering and/or the like, identify interrelationships between hand gesture components. For example, a k-means clustering technique may be used to group an initial point motion towards a virtual object within the environment with a subsequent wrist flick movement directed to a physical object, another virtual object or a person. As a more particular example, a Bayesian classifier may categorize such a group as symbolic activity associated with communicating a document to a mobile device. The context-aware interaction system 102 may generate commands for creating an email, attaching the document, references an email address for the mobile device from a corresponding profile and executing a send email operation.

According to one exemplary implementation, the context data 110 may be used by the context-aware interaction system 102 in determining intent. For example, the context data 110 may reveal user positions, user roles, user activities, physical object or virtual object nuances and/or the like that alter the vocabulary meanings. As a more particular example, a gesture in front of a conference room whiteboard may be interpreted differently from the same gesture while the user is in a moving vehicle. As another more particular example, a gesture made by a speaker in a presentation may be interpreted differently from the same gesture made by a participant. Moreover, the context-aware interaction system 102 may restrict the multimodal inputs allowed to suit the target output mechanism 108. For example, while voice commands may be accepted at all times, during a game the user may have to gesture to select an icon or select an answer rather than provide a spoken answer in order to avoid a misinterpretation that interferes with the game.

With the various input data and the context data 110, a user may be able to use any appropriate speech, gesture, touch, gaze, keyboard, and/or the like to implicitly or explicitly clarify his or her intent via the context-aware interaction system 102 to the target output mechanism 108. By way of an explicit example, if the user desires to modify a certain architectural element in a three-dimensional scene, the user may gesture towards a point in the direction of that element and move to another point. As an alternative example, the user may say, "change the color of the bench that is behind the wall to red." The context-aware interaction system 102 accesses the model 114 to determine that the intent of either the pointing gesture or the verbal statement is to select the element based upon the current mode of the target output mechanism 108 that is presenting the scene. The context-aware interaction system 102 sends a command to the target output mechanism 108 to either move the selected element to another position or change the color of that selected element (the bench) to red.

By way of another example, the context-aware interactive system 102 may implicitly understand that a user wants to place a phone call to another employee if the user stares at an icon or avatar representing that employee on a display (e.g., in a contacts list) and makes a gesture indicative of a telephone call (e.g., points to a telephone icon, or simulates holding a phone to her ear). In this example, gaze tracking is one input modality, and gesture is another input modality, which when combined with the identity of the currently displayed image, implicitly determines the intent of the user.

As described herein, the context-aware interactive system 102 may solve various symbolic activity interpretation issues by compensating for errors in some input modalities using the historical data 112. For example, if a physical object, such as a "television monitor", is occluded by another object, such as a "desk", a previous interaction specifying that the physical object of interest is a "television monitor that is blocked by the desk" facilitates interpretation of a current pointing gesture for which the context-aware interactive system 102 yields a correct determination of intent. As another example, if a virtual object, such as a document projected on a display by on a word processing program, is repeatedly selected when a user points in a certain direction, the context-aware interactive system 102 may correct an imprecise user gesture that is within an acceptable variance range. In one exemplary implementation, the context-aware interactive system 102 computes a likelihood value that the document is selected given a deviation from the certain direction. If the likelihood value exceeds a threshold value defined by the model 114, the user most likely intended to select the document.

By way of a multi-user example, consider multiple users, whether detected by the same or multiple cameras (e.g., one or more of which may be remote), working together on an electronic display within a physical workspace. The context data 110 includes a profile for each user's computing devices and each user. One user's handwriting on a tablet or in the air may write text to the electronic display, while another user's gesture in the air may select, move, edit and/or erase the text. Yet another user's speech may write comments to a final version of the text or to another document being displayed. The context data 110 may differ for each, and whether or not the users are in the same room or are remote from one another may be used as a factor in interpreting the input.

By way of a more particular multi-user example involving a remote user of the physical workspace, the context-aware interaction system 102 senses data associated with the remote user and projects an avatar representing the remote user onto the electronic display. The context-aware interaction 102 may characterize the avatar as another virtual object with which other users interact. For example, the remote user may be a participant to a meeting in which the remote user and other participants communicate through the avatar. The context-aware interaction 102 may also interpret symbolic activity that is performed by or directed to the remote user via the avatar. The remote user may use a particular hand gesture to edit the text on the electronic display and another meeting participant may face the avatar and utter speech instructing the context-aware interaction system 102 to communicate an email, which is delivered to the remote user's local computer or personal mobile device depending on the user profile.

By way of another multi-user example, a group of users may interact with each other within a virtual environment, such as a shared virtual workspace. A set of sensors (e.g., cameras) and input devices that capture detailed information for each user location, which is projected onto the virtual environment. Each user may be identified through a unique avatar and may communicate with other users' avatars. The context-aware interaction system 102 may be distributed across each user location. In a manner similar to the physical work space, the users or associated avatars perform symbolic activities that are transformed into one or more commands for virtual output mechanisms. For example, the user may use hand gestures or spoken words to instruct a virtual representation of a display device to output video content or a document.

By way of yet another multi-user example, a group of users participating in a meeting in a shared workspace are editing a virtual object, such as a shared document that is presented on a display. Based on environment-related data associated with such a meeting, the context-aware interaction system 102 transforms symbolic activity by the users into actionable commands. The context-aware interaction system 102 may identify a command modifying portions the shared document when a user looks at the display and utters speech specifying what change to make. For example, the user may look at a particular sentence and say "delete the sentence". Alternatively, the context-aware interaction system 102 may interpret movements by another user who pointed at chart followed by speech specifying what change to make as another command to modify the shared document. For example, the user may point to a chart and say "change the color of the columns from blue to red".

By way of a further example, the users participating in the meeting are performing symbolic activity for moving text from another document to the shared document. The other document may be a previous iteration of the shared document and retrieved from the historical data 112. The symbolic activity may include a single speech utterance, such as "move this there", followed by two separate point gestures from which the context-aware interaction system 102 transforms into a command that moves text from a first position to a second position. Alternatively, the context-aware interaction system 102 may combine a first speech utterance and a first pointing gesture with a second speech utterance and a second pointing gesture punctuated by a pause and interpret such a combination as symbolic activity for moving text. As a response, the context-aware interaction system 102 executes a command that copies text from the other document at a position associated with the first pointing gesture and pastes on the shared document at a position associated with the second pointing gesture.

The context-aware interaction system 102 may execute other various commands with respect the shared document according to other exemplary implementations. For example, a user may point to the shared document and utter the following speech: "Email Document to person at email dot com". The context-aware interaction system 102 converts such symbolic activity into executable instructions for an email service, which responds by composing an email, adding the indicated send address, attaching the shared document and communicated the email.

If the recipient is also a participant in the meeting, the context data 110 may provide the send address as a component of the participant's profile. The context-aware interaction system 102 may recognize the participant through facial recognition or a Radio Frequency Identifier (RFID) scan and add the participant profile to the model 114. Hence, the user may simply point to the participant's computer or mobile phone as a destination of symbolic activity for communicating data. The context-aware interaction system 102 parses such a gesture using a context-dependent grammar structure that specifies the participant mobile phone as the destination and substitutes an appropriate email address from the context data 110. For example, the user may perform a swipe motion that first points to a document on a projector and ends at the destination location. As another example, the user may hold a mobile phone displaying a file and flick a wrist in the direction of the destination location, which causes the context-aware interaction system 102 to communicate the file to the participant mobile device.

In yet another example, the context-aware interaction system 102 may interpret rotational and/or forward/backward hand movements as symbolic activity for rotating a virtual object about an axis and/or moving the virtual object along an axis in three-dimensional space, respectively. For example, a user may manipulate the virtual object by rotating an architectural diagram or mechanical figure about a z-axis. As another example, the user may manipulate a document being displayed on a projector by zooming in or zooming out.

Prior to communicating a command to the target output mechanism 108, the context-aware interactive system 102 may examine utility data 116, which indicates a cost or potential outcome of executing the command. For instance, consider that the command is to delete a shared document, the execution of which may be detrimental to the progress of a meeting, the context-aware interactive system 102 may recognize the high cost and provide feedback 118 (e.g., semantic feedback) by asking the user if the underlying symbolic activity was interpreted correctly (e.g., "Did you mean to delete the document?"). Based on the feedback 118, the context-aware interactive system 102 may provide a warning and/or a confirmation request (e.g., "Such a command may be detrimental, are you sure you want to delete the document?").

As another example, if the command is to email a large file to an outside email address, the utility data 116 may indicate that such a command is not detrimental on the surface, but based on the historical data 112, such a command is abnormal for the initiating user. As an alternative example, the utility data 116 may indicate that the email may be too costly to send resource-wise or take too long time-wise. In either example, the context-aware interactive system 102 may require confirmation, such as a voice confirmation or an acknowledgment through a dialog box. After executing the command, the target output mechanism 108 may provide execution results in the form of voice data indicating a success or a failure.

The knowledge of which output mechanisms 108 are currently available for rendering output, such as 2D and 3D displays, multi-person displays, gestural displays, printers, kinetic displays, speakers, headphones, mobile devices, other peripherals, public displays, displays of other devices, also may serve as input data or state data to the context-aware interaction system 102 and may be referred to as the context data 110. The context data 110 may also reveal operational capabilities provided by the output mechanisms 108 as well as acceptable commands for effectuating these operational capabilities.

Still other context data 110 known to the context-aware interaction system 102 includes information about user tasks and intent in real-time through a variety of means, including window focus, use of input modalities, social network activities, login/authentication state, information being exchanged with other systems, language being used, running programs, live connections to other services and so forth. Another example of the context data 110 includes environment-related information, such as environment uses/purposes, meeting schedules and device usage statistics. Yet another example of such the context data 110 that may be input into the context-aware interaction system 102 may include a pre-set or a user-selected current operating mode/override of each output mechanism 108, such as to specify how to use a device in a different way (e.g., using a digitizer to input gestures instead of handwriting).

Figure 2:
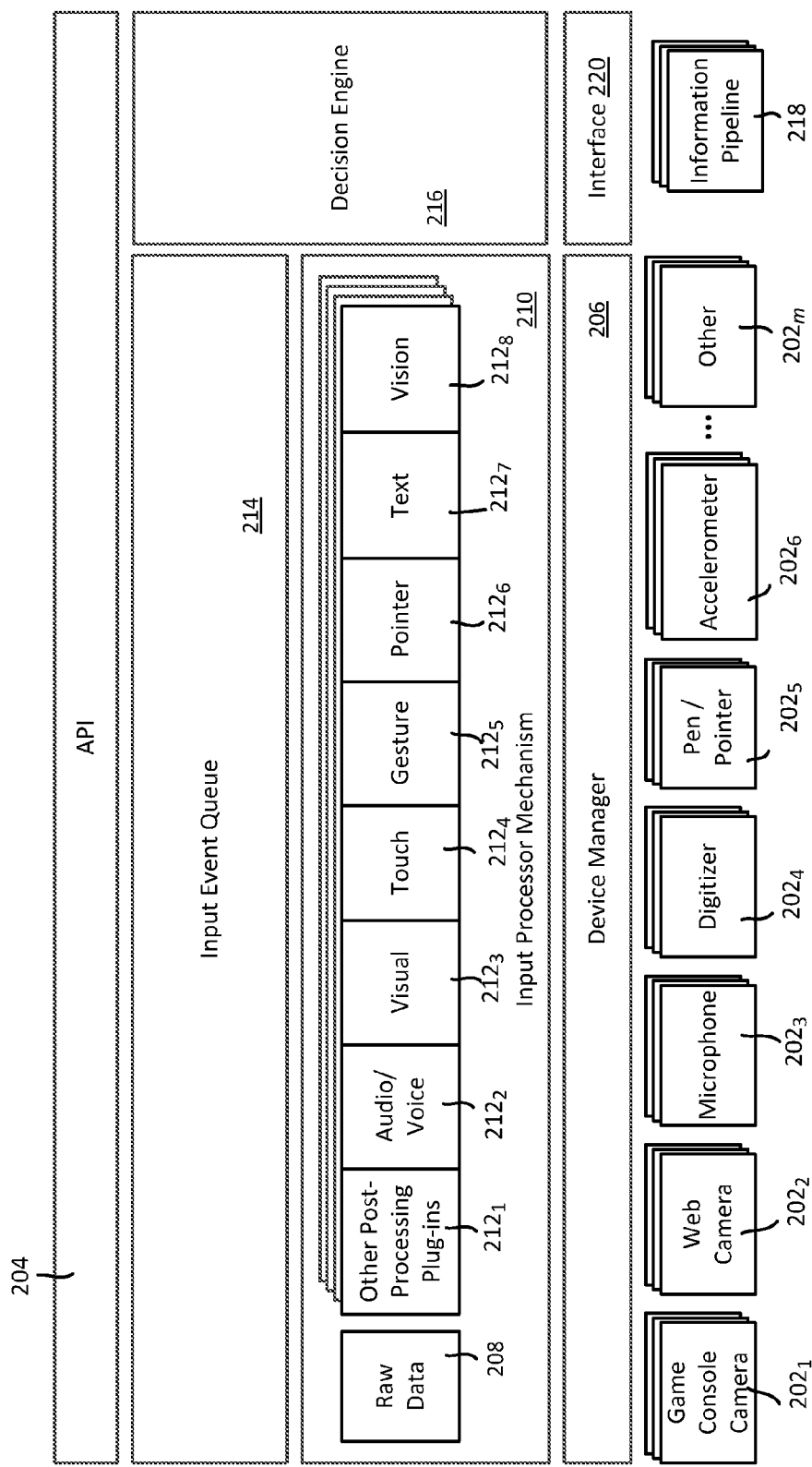
FIG. 2 is representation of an exemplary architecture suitable for using multimodal input to interpret context-based symbolic activity within a context-aware interactive system according to one example implementation.

FIG. 2 is representation of an exemplary architecture suitable for using multimodal input to interpret context-based symbolic activity within the context-aware interactive system 102 according to one example implementation. A plurality of devices $202_1$-$202_m$ and the context-aware interactive system 102 may be coupled to a target output mechanism via an API 202. Note that to accommodate multiple users, each device is represented by multiple blocks in FIG. 2, although it is understood that not all represented devices need be present in a given configuration, or that more input devices or different input devices than those shown in the examples shown may be present.

As illustrated in FIG. 2, a set of one or more game console cameras (e.g., depth sensing cameras), web cameras, microphones, digitizers, pens/pointing devices, accelerometers and "other" devices corresponding to possible input modalities are shown as the devices $202_1$-$202_m$, respectively. The other devices $202_m$ may include motion controller components, such as a magnetometer, infrared structured light and/or the like. Other input modalities that may be utilized include electronic ink from a pen device, gaze (direction, elapsed time), proximity sensing, speech, air gestures, body position/body language, facial expression, mirroring as reinforcement (e.g., looking in the direction of pointing, miming), touch, multi-touch mouse, brainwave computer input, keyboard, in-air mouse (e.g., soap), musical instrument (e.g., MIDI), manipulating a physical interface (e.g., a glove, or haptic interface), and so forth. Mood sensing such as combining facial expression with facial color changes, temperature, grip pressure and/or other possible indicators of mood is another feasible input modality.

The various devices $202_1$-$202_m$ provide input signals to a device manager 206, which in turn provides appropriate raw data 208 for processing via an input processor mechanism 210. The input processor mechanism 210, which may be hard-coded to an extent and/or include plug-ins $212_1$-$212_8$ for handling the input data (e.g., signals) of various modalities, processes the raw data 208 into input events which are queued in an input event queue 214 for processing by a decision engine 216. As shown in FIG. 2, other post-processing plugins (or hardcoded code), audio, visual, touch, gesture, pointer and text processing components $212_1$-$212_n$ are shown as examples, respectively, however it is understood that not all represented components need be present in a given configuration, or that more components or different components than those shown in the examples shown may be present.

The raw data 208 may be kept synchronized by a time stamp or the like, as well as maintained in association with the type of input device that provided them. For each input modality, the decision engine 216 determines when to start and stop recording a single input event. The decision engine 216 subsequently combines two or more single input events into a multimodal input event that includes different input signals, such as digitized speech data from a microphone and point coordinates for handwritten strokes from a pen device.

In one exemplary implementation, single input events are aggregated before a meaning or intent can be determined. The single input events may be combined using various parameters, such as temporal or spatial parameters. A temporal based alignment of the single input events may be accomplished using the associated timestamps. A spatial based alignment may be accomplished if the single input events originated in same physical area. In another exemplary implementation, the single input events are converted to a more convenient representation, such as a text string for speech data or a sequence of gesture shapes for the pen device input) before being combined into the multimodal input and interpreted.

According to yet another exemplary implementation, the decision engine 216 assigns a partial meaning for each single input event and then, merges these partial meanings to form a joint interpretation. The partial meanings may be aligned purely on a context-dependent semantic basis. The joint interpretation may include a list of possible interpretations sorted by probability, given current inputs and context. The context-aware interactive system 102 may provide feedback or partial (speculative) execution of one or more such interpretations, in real-time, pending a (explicit or implicit) cessation of the single input events. When the single input events may be interpreted unambiguously, the context-aware interactive system 102 may revoke the feedback or partially executed outcome(s) of competing interpretations that have been rendered incorrect. Such schemes enable the context-aware interactive system 102 to have an improved response to a plurality of ongoing input events, rather than forcing the context-aware interactive system 102 to wait until the end of a multi-modal utterance or input stream causing feedback and response latency.

As part of the processing and queuing, the input processor mechanism 210 may communicate with the decision 216, which, as described above, may access a semantic model for interpreting symbolic activity to determine whether the raw data 208 corresponds to intended input or not, and if so, how the data is to be queued. For example, the decision engine 216 may access a custom speech and gesture dictionary to convert audio data to text, with the text then queued. Although not explicitly shown, the decision engine 216 may incorporate or otherwise may be coupled to appropriate recognition engines for this purpose. Note that the receiving program itself may comprise such the decision engine, or may communicate with one, in which event pre-recognized data may be sent by the context-aware interaction system 102 to the target output mechanism.

The decision engine 216 may process the data in the input event queue 214 to identify commands for the target output mechanism. Note that commands may be in the form of text, pointer data, and so forth, as appropriate for the receiving target output mechanism. Note that the target output mechanism program may forward the commands to another target output mechanism; for example, the target output mechanism may route the commands to whatever output mechanism has user focus. Focus may be switched by gaze tracking data or other input recognized by the receiving program.

To support symbolic activity interpretation, the information pipeline 218 supplies various contextual information (e.g., the context data 110 of FIG. 1), including environment data (e.g., event schedule, device list, audio/visual and communication capabilities and/or the like), user profiles (e.g., facial/speech recognition data, user descriptions, related mobile phones and computing devices, email addresses and/or the like), and/or virtual/physical object profiles (e.g., device metadata (e.g., interfaces/operation modes), program instructions, documents, databases, media files and/or the like). The contextual information may also include environment data (e.g., a geometric model of a work space, such as a conference/meeting room, labs, offices, retail environments, classrooms, medical environments (e.g., operating rooms, emergency rooms, consultation rooms, etc), network operations centers, control rooms reception areas, a production site, a exhibition hall and/or the like).

The information pipeline 218 also may provide historical information (e.g., historical data 112 of FIG. 1), such as a conversation/interaction history (e.g., detailed conversation exchanges between users, interactions between the users and objects and/or the like). The information pipeline 218 further supplies a semantic model (e.g., the model 114 of FIG. 1) defining a context-dependent grammar for interpreting symbolic activity from input events.

When interpreting symbolic activity, not only is a current input event considered, but preceding (and possibly subsequent) events as well as the context data 110 of a given environment also may be considered and/or correlated. Using these input events, the decision engine 216 may define a context-dependent grammar by creating rules for translating input events into commands for the target output mechanism. Thus, for example, a user participating in a brainstorming session or a technology disclosure meeting may say something that is converted to a command because the user has previously made a gesture (e.g., a raised hand) indicative of wanting to edit a diagram displayed on an electronic whiteboard (e.g., "delete box", "replace figure" and/or the like). When the user stops making the gesture (e.g., a lowered hand), speech will again be entered into the document as text. As another example, the user may intend on commenting on the diagram instead of adding text or any other editing. The decision engine 216 may provide handwriting data (as is or recognized as text) to the program controlling the electronic whiteboard in response to a statement, such as "I have a comment", indicating such an intention.

In with a difference context, such as a user listening to a presentation, a similar gesture (e.g., a raised hand) may indicate a desire to ask a question to a presenter that, when combined with subsequent gesture (e.g., a finger pointing to the user, a gaze and head nod towards the user) and speech (e.g., "yes [user name]") acknowledging the user, is converted into a command for turning on an adjacent microphone and/or recording the question. Accordingly, the decision engine 216 may create different (grammar) rules for interpreting such a gesture in the context of a meeting versus the context of a presentation. These rules are stored in a semantic model (e.g., the model 114 of FIG. 1).

In one exemplary implementation, the decision engine 216 interprets symbolic activity from the input event queue 214 using a mechanism for classifying multimodal input data. One embodiment of such a mechanism is a Bayes classifier. Consider a sequence input events $t_m$, where m=1 . . . M, which is associated with one of several symbolic activity classes $c_n$, where n=1 . . . N. Based on observed input events, the decision engine 216 selects a maximum a posteriori (MAP), which is a symbolic activity output class having a highest a posteriori probability. Assuming the input events are independent as well as conditionally independent given a target symbolic activity class, an example expression for the Bayes classifier is:

$$\underset{c_n}{\operatorname{argmax}}(c_n \mid t_1 \ldots t_m)$$

According to one exemplary implementation, after a considerable number of observations, the decision engine 216 defines a context-dependent grammar for interpreting symbolic activity within the given environment and then, building a semantic model. Hence, the decision engine 216 uses the observations to train the Bayes classifier to identify appropriate symbolic activity.

Figure 3:
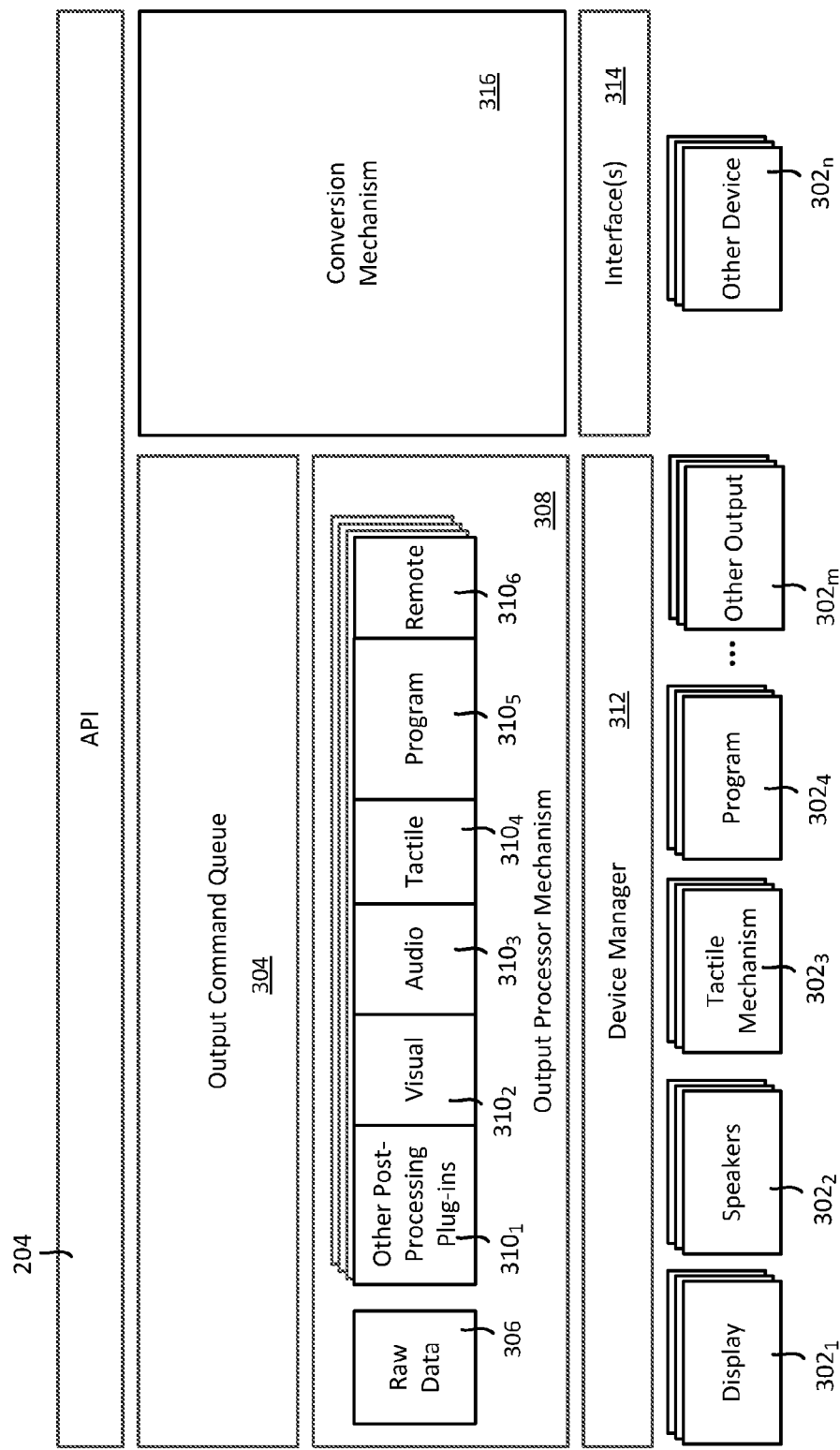
FIG. 3 is a representation of an exemplary architecture suitable for using context-based symbolic activity to execute commands on a target output mechanism of a context-aware interactive system according to one example implementation.

FIG. 3 is a representation of an exemplary architecture suitable for using context-based symbolic activity to execute commands on a target output mechanism of a context-aware interactive system according to one example implementation. Via the API 204, the context-aware interaction system 102 may be coupled to a plurality of output mechanisms $302_1$-$302_m$. In FIG. 2, a set of one or more displays, speakers, tactile/haptic mechanisms (e.g., a vibrating phone or a tactile game controller), one or more programs and "other" are shown as the output mechanisms $302_1$-$302_5$, respectively, that correspond to possible output modalities.

For example, a program $302_4$ may include a software application or operating system component running on a computer system. As another example, the plurality of output mechanisms may include various devices, such as a display $302_1$. An output command queue 304 stores command-related data for operating the plurality of output mechanisms 302. The command-related data may include one or more commands as well as content (e.g., video content, document data and/or the like) to be displayed and/or communicated. The command-related data may be transformed into raw data 306 on which the context-aware interaction system 102 affixes time data (e.g., timestamps) for synchronization purposes and stores in an output processor mechanism 308.

As described herein, the decision engine 216 processes the various input data and makes a determination as to what each user likely intends with respect to what output modality or modalities are desired. The output processor mechanism 308, which may be hard-coded to an extent and/or include plug-ins $310_1$-$310_6$ for handling the output data of various modalities, processes the raw data 306 into formatted output data. As shown in FIG. 3, other post-processing plug-ins (or hard-coded code), along with audio, visual, tactile, program and remote (e.g., networking) components $302_1$-$302_m$ are shown as examples, respectively, however it is understood that not all represented components need be present in a given configuration, or that more components or different components than those shown in the example may be present.

The various output mechanisms $302_1$-$302_m$ may couple to the content-aware interactive system 102 via at least one device manager 312. Note that to accommodate the possibility of multiple output mechanisms/multiple users, each output mechanism $302_1$-$302_m$ is represented by multiple blocks in FIG. 2, although it is understood that not all represented devices need be present in a given configuration, or that more output mechanisms or different output mechanisms than those shown in the examples shown may be present.

Also represented in FIG. 3 is output $302_n$ for one or more other devices, whether for the same user or a different user, which couple to the content-aware interaction system 102 through one or more suitable interfaces 314. For example, output $302_n$ can be generated from a master computer, which is then customized and rendered on one or more various other local or remote devices (e.g., as shown in FIG. 3), as desired. In other words, intent can be interpreted on local/master computer system or a slave computer system, with output generated from the master, and customized and rendered on various local or remote devices. Multi-user intent can be interpreted on master or slave devices, and output can be rendered to slave devices as well.

The conversion mechanism 316 may include a text-to-speech engine, speech-to-text engine, dictionaries, entity extraction engines (to process still images, video, or 3D visuals to convert what is being shown to text or speech), and so forth to format/convert the raw data 302 to the desired output format. For example, the conversion mechanism 316 may access a custom speech dictionary and convert audio data to text, with the text then queued for output.

Note that the decision engine 216 may not necessarily determine the output directly, but in one alternative, may process the data in the output command queue 304 only to make decisions to the program $302_4$ that consumes the queued data. For example, the output data may be provided in a variety of formats and types to a program $302_4$ and the decision engine 216 only suggests which type of output modality is likely desired. This allows the output mechanisms 302 to override a suggestion, such as on specific request of the user through that program or device.

Note that an output device or a receiving program may forward the decisions to another output device or program. For example, the receiving program may route the decisions to a remote or local device, which may choose to use them or not. Consider an example where speech is routed to a mobile phone or text is communicated to the display; the local device program may or may not use the data.

Figure 4:
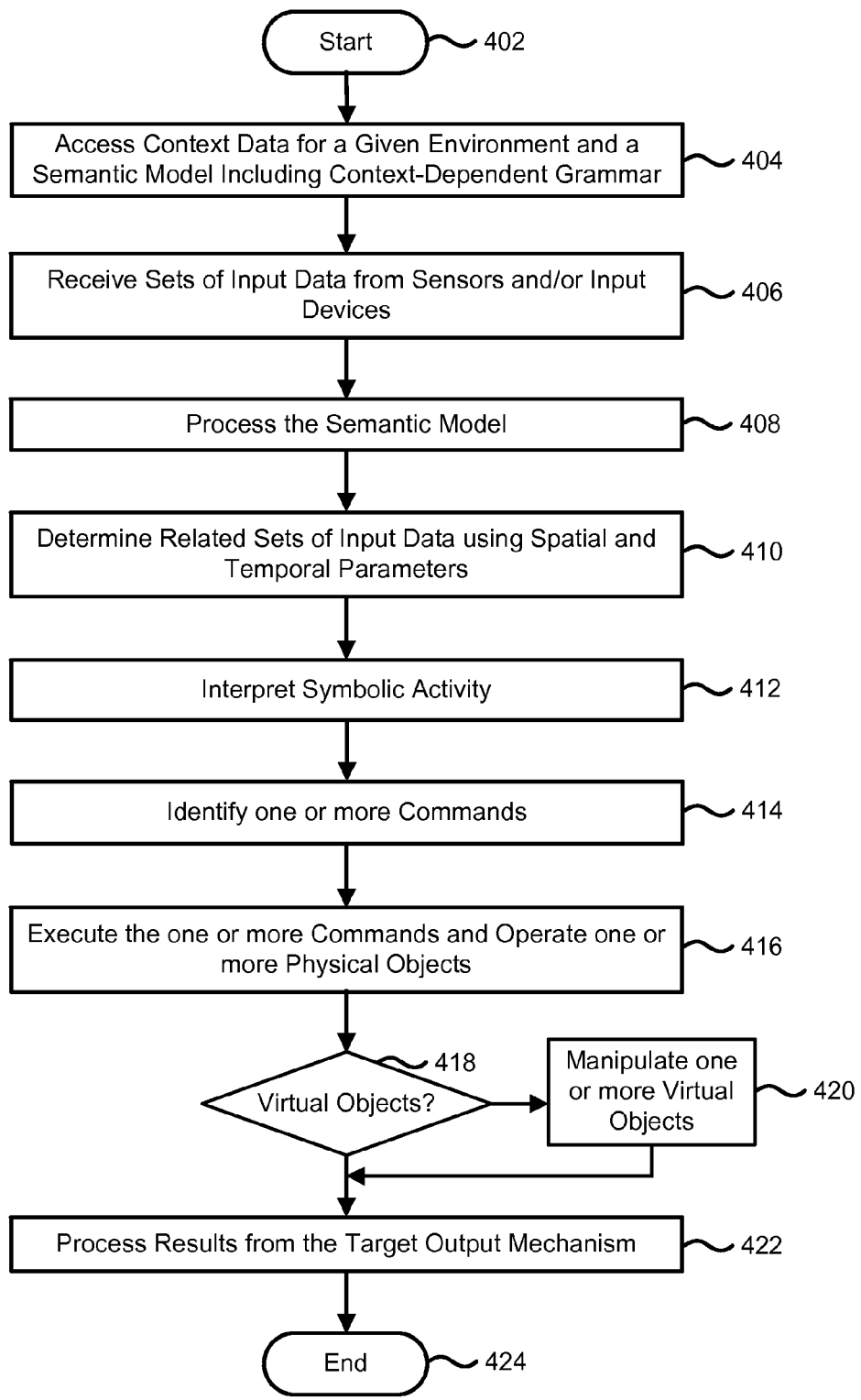
FIG. 4 is a flow diagram illustrating exemplary steps for detecting symbolic activity in a given environment according to one example implementation.

FIG. 4 is a flow diagram illustrating exemplary steps for detecting symbolic activity in a given environment according to one example implementation. Steps depicted in FIG. 4 commence at step 402 and proceed to step 404 when the context-aware interactive system 102 accesses context data for a given environment and a semantic model (e.g., the model 114 of FIG. 1) that includes a context-dependent grammar. As described herein, the context data may be ascertained from information provided by one or more sensor devices. In one exemplary implementation, the context data may include profiles for describing physical objects, virtual objects and/or users associated with the given environment. These profiles may indicate physical/virtual object operations, environment purposes, user roles and/or the like.

The context data may be used to build the semantic model by defining the context-dependent grammar based on various input modality dictionaries. For example, the context-dependent grammar includes rules governing syntax and composition of input events from input modalities. The semantic model includes a vocabulary that may be structured using the context-dependent grammar and implemented specifically for interpreting symbolic activity within the given environment. The semantic model may also include confidence values or probabilities associated with each vocabulary entry actually occurring within the given environment. In one exemplary implementation, the context-aware interaction system 102 translates one or more modal or multimodal input events into the symbolic activity, which is transformed into one or more commands directed to one or more target output mechanisms.

Step 406 is directed to receiving sets of input data from sensors and/or input device(s). Step 410 is directed to processing the semantic model. In one exemplary implementation, the context-aware interaction system 102 updates existing context-dependent grammar rules, creates new rules and/or deletes obsolete or erroneous rules. The context-aware interaction system 102 may also alter probabilities within the semantic model.

Step 410 is directed to determining related sets of input data using spatial and/or temporal parameters. In one exemplary implementation, the related sets of input data include input events that are synchronized according to time data (e.g., corresponding timestamps) or origination location within a given environment. Alternatively, the input events may be aggregated by related semantic meaning. Step 412 is directed to interpreting symbolic activity from the related sets of input data. In one exemplary implementation, the context-aware interaction system 102 decides which vocabulary entry or entries best match the related sets of input data according to similarity. Step 414 is directed to identifying one or more commands for a target output mechanism. The semantic meanings corresponding to the related sets of input data comprise the one or more commands.

Step 416 represents execution of the one or more commands, which involves operating one or more physical objects. The one or more commands may activate certain devices (e.g., a computing device, a display and/or the like) and initiate certain functions (e.g., turn on the display or the computing device). In one exemplary implementation, the context-aware interactive system 102 provides feedback informing the user of a cost associated with executing the one or more commands. For example, the context-aware interactive system 102 may require confirmation of the one or more commands.

Step 418 is a determination as to whether any of the one or more commands correspond to any virtual objects. If the one or more commands correspond with one or more virtual objects, step 418 of FIG. 4 proceeds to step 420 where the context-aware interactive system 102 manipulates the one or more virtual objects as instructed by the one or more commands. In one exemplary implementation, the context-aware interactive system 102 converts the one or more commands into executable instructions for running a program (e.g., a word processing application) and opening/editing various files. If the one or more commands do not correspond with any virtual object, step 418 of FIG. 4 proceeds to step 422.

Step 422 represents processing results from the target output mechanism in response to performance of the one or more commands. Step 424 is directed to terminating the steps described in FIG. 4.

Figure 5:
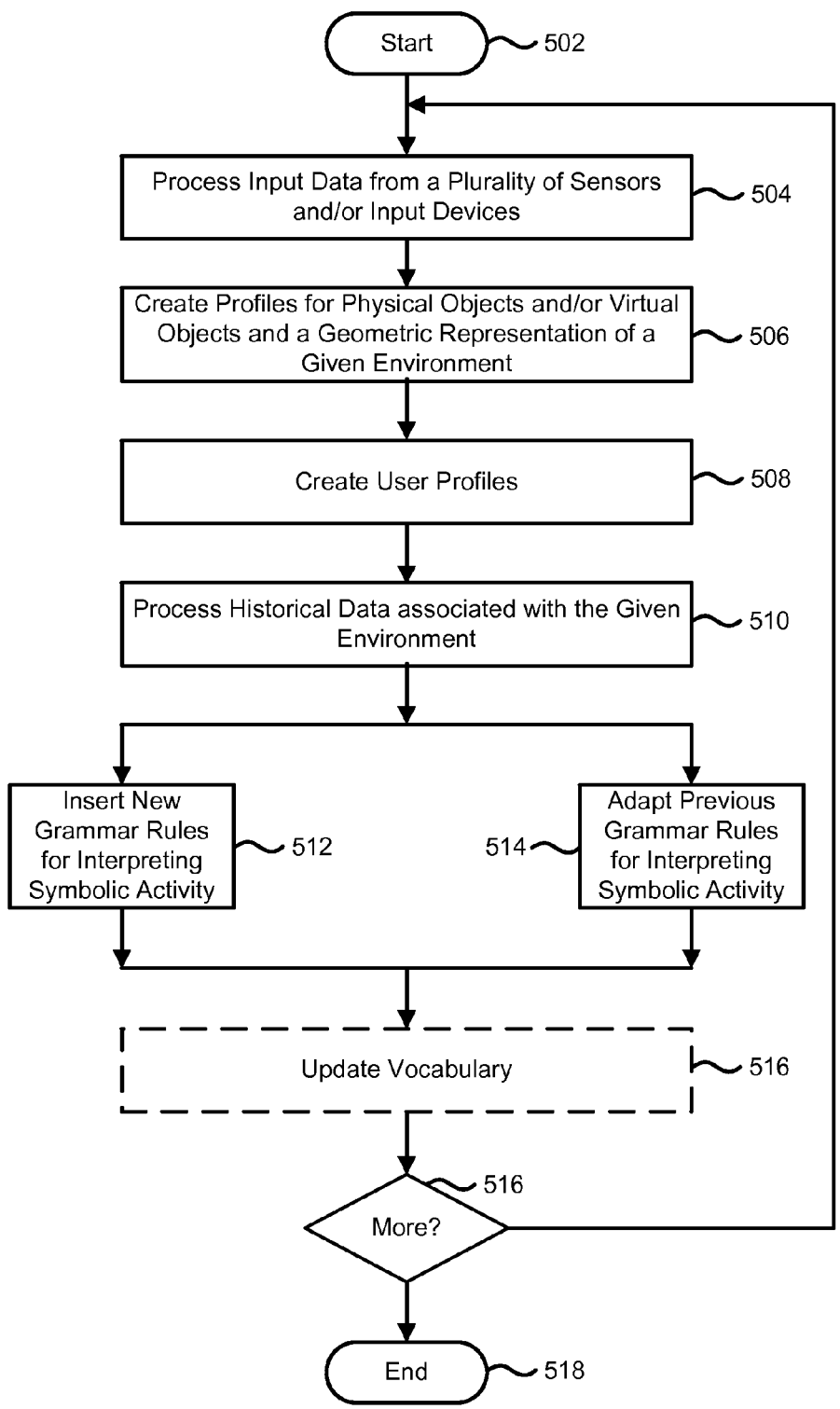
FIG. 5 is a flow diagram illustrating exemplary steps for building a model that defines context-dependent grammar for interpreting symbolic activity according to one example implementation.

FIG. 5 is a flow diagram illustrating exemplary steps for building a model that defines context-dependent grammar for interpreting symbolic activity according to one example implementation. Steps depicted in FIG. 5 commence at step 502 and proceed to step 504 where the context-aware interactive system 102 processes input data from a plurality of sensors and/or one or more input devices that correspond with one or more input modalities. Step 506 refers to creating profiles for physical objects and/or virtual objects as well as creating a geometric representation of a given environment. In one exemplary implementation, the context-aware interaction system 102 augments three-dimensional position data of the geometric representation with user names, physical object/virtual object identifiers and other environment-related data.

Step 508 is directed to creating profiles representing users associated with the given environment. As described herein, the user profiles may refer to participants in a meeting or listeners in a presentation. The user profiles and the object profiles may indicate physical object functionality, virtual object uses, environment-related purposes, user roles/capabilities and/or the like. Within the geometric representation, the context-aware interaction system 102 may also annotate the user names and the physical/virtual object identifiers with information corresponding to the user profiles and the object profiles, respectively. The user profiles, the object profiles, and the geometric representation of the given environment may be stored as context data (e.g., the context data 110 of FIG. 1).

Step 510 represents processing historical data associated with the given environment. The context-aware interactive system 102 uses observations stored in the historical data to define the context-dependent grammar for interpreting symbolic activity, which is used to create new rules for and/or train existing rules in the semantic model. According to one exemplary implementation, the context-aware interactive system 102 proceeds to step 512 where new context-dependent grammar rules are inserted into the semantic model. In another exemplary implementation, the context-aware interactive system 102 proceeds to step 514 where previous context-dependent grammar rules are adapted/improved. It is appreciated that step 512 and step 514 may be performed together.

Step 516 represents an optional update of a vocabulary for determining a user-intended meaning of the symbolic activity. If a vocabulary entry comprising one or more input events may be modified to improve the determination of intent from the input data (e.g., training), the context-aware interaction system 102 updates the vocabulary entry accordingly. Furthermore, the context-aware interaction system 102 may update the vocabulary in response to the new or adapted context-dependent grammar rules. Step 518 is directed to determining whether there are more observations for building the semantic model. If there are more observations, step 518 of FIG. 5 returns to step 504. If there are no more observations, step 518 of FIG. 5 proceed to step 520. Step 520 refers to terminating the steps described in FIG. 5.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
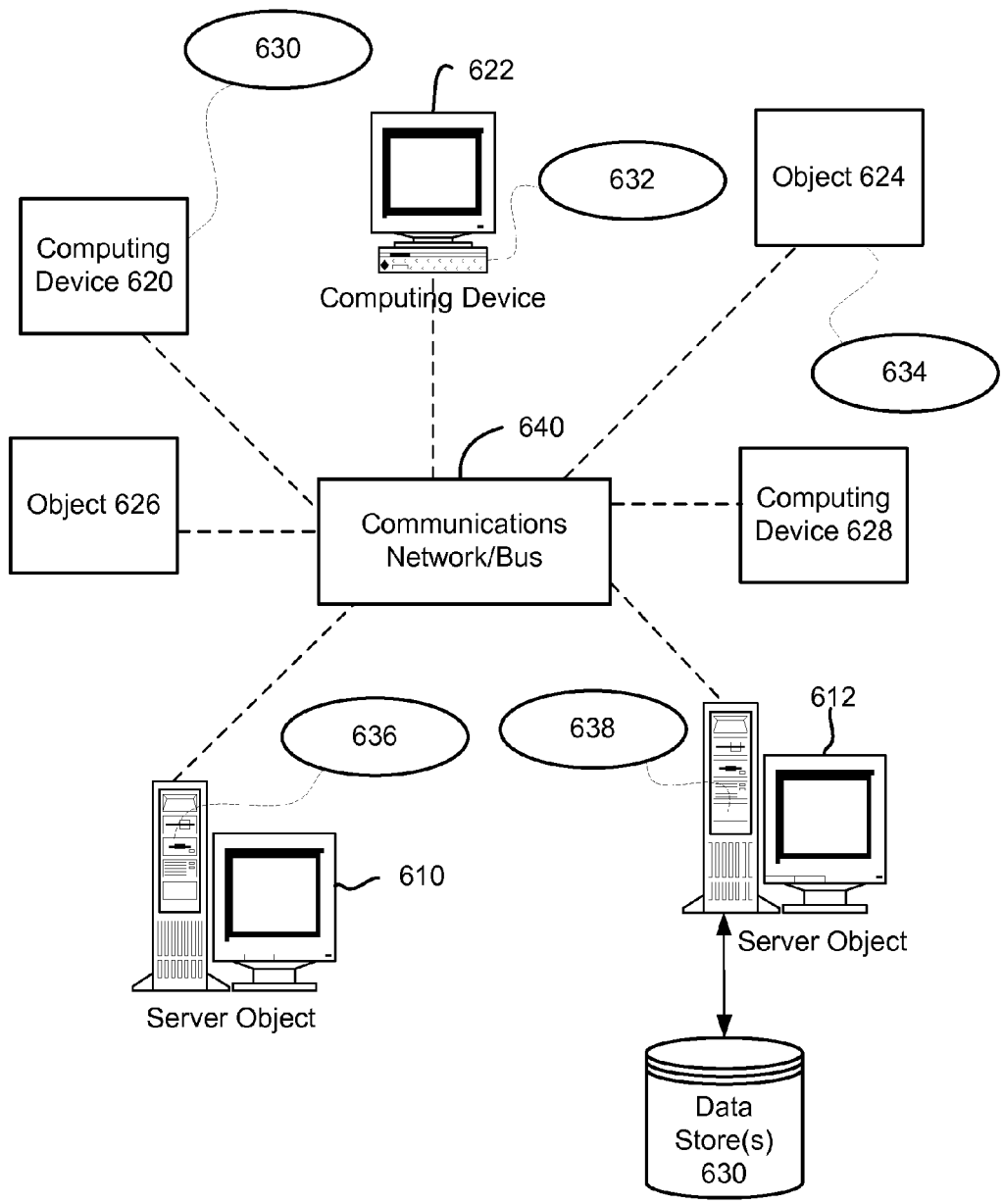
FIG. 6 is a block diagram representing exemplary non-limiting networked environments in which various embodiments described herein can be implemented.

FIG. 6 provides a schematic diagram of an exemplary networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
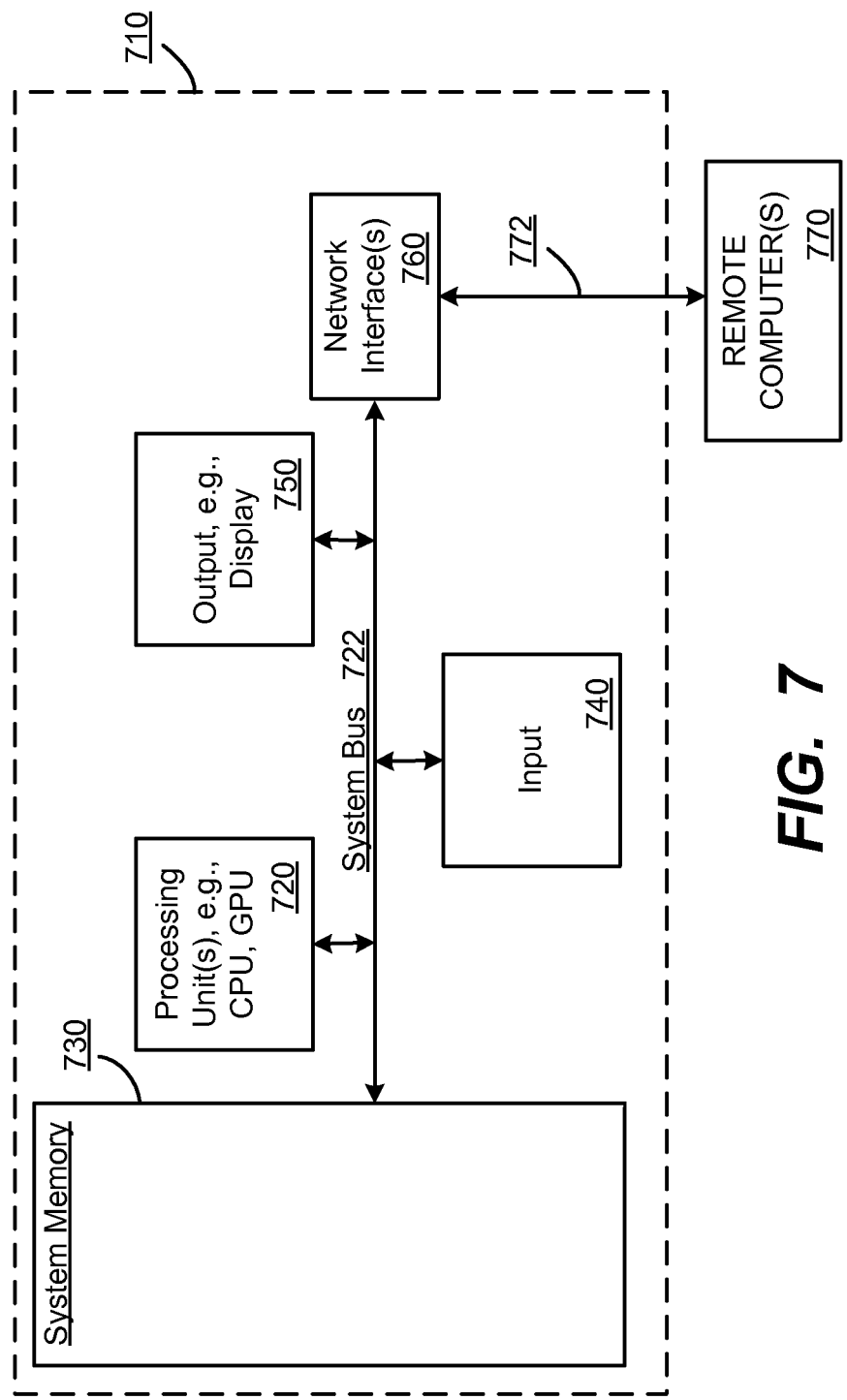
FIG. 7 is a block diagram representing an exemplary non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the exemplary computing system environment 700.

With reference to FIG. 7, an exemplary remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software, or where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising, detecting symbolic activity between at least two users of a given environment, including receiving sets of input data corresponding to one or more input modalities, processing a model associated with context-dependent grammar for the given environment, using the model to interpret the symbolic activity within the sets of input data, and identifying one or more commands directed to a target output mechanism based on the symbolic activity.

2. The method of claim 1 further comprising executing the one or more commands on the target output mechanism, wherein the target output mechanism operates one or more physical objects.

3. The method of claim 1 further comprising executing the one or more commands on the target output mechanism, wherein the target output mechanism manipulates one or more virtual objects.

4. The method of claim 1 further comprising generating feedback associated with executing the one or more commands using utility data.

5. The method of claim 1 further comprising determining related sets of input data based on the model.

6. The method of claim 5, wherein determining the related sets of input data further comprises determining the related sets of input data using temporal and spatial parameters.

7. The method of claim 1, wherein using the model to interpret the symbolic activity further comprises interpreting the symbolic activity using physical properties associated with objects within the given environment.

8. The method of claim 1, wherein processing the model further comprises defining the context-dependent grammar.

9. The method of claim 8, wherein defining the context-dependent grammar further comprises updating rules for the context-dependent grammar using the context data.

10. The method of claim 1, wherein processing the model further comprises building a vocabulary for the model using historical data and the context data.

11. In a computing environment, a system, comprising:
a plurality of devices that each input raw data corresponding to an input modality;
an input processor mechanism configured to process the raw data into input events;
a decision engine configured to process a context-dependent grammar comprising rules for syntax and composition of the input events based on context data for a given environment, determine a user-intended meaning of one or more of the input events using the context-dependent grammar, and transform the user-intended meaning into one or more commands for an output mechanism; and
an output processor mechanism configured to execute the one or more commands on the output mechanism.

12. The system of claim 11, wherein the plurality of devices include a camera, a microphone, a digitizer, a pen, or a pointing device, or any combination of a camera, a microphone, a digitizer, a pen, or a pointing device.

13. The system of claim 11 wherein the input processor mechanism includes an audio/voice processing component, a visual processing component, a touch processing component, a gesture processing component, a pointer processing component, a text processing component or a vision processing component, or any combination of an audio/voice processing component, a visual processing component, a touch processing component, a gesture processing component, a pointer processing component, a text processing component or a vision processing component.

14. The system of claim 11 wherein the output processor mechanism includes an audio processing component, a visual processing component, a tactile processing component, a program processing component, or a remote processing component, or any combination of an audio processing component, a visual processing component, a tactile processing component, a program processing component, or a remote processing component.

15. The system of claim 11 wherein the decision engine defines a context-dependent grammar for determining a user-intended meaning behind the input events.

16. The system of claim 11 wherein the decision engine classifies the one or more of input events as symbolic activity.

17. One or more computer-readable storage media having computer-executable instructions, which when executed perform steps, comprising:

processing input events corresponding to a plurality of input modalities within a given environment;

interpreting symbolic activity from the input events using a context-dependent grammar associated with the given environment, the context-dependent grammar to capture syntactic input events in relation to semantics of the syntactic input events; and converting the symbolic activity into one or more commands for a target output mechanism; and instructing the target output mechanism to execute the one or more commands.

18. The one or more computer-readable storage media of claim 17 having further computer-executable instructions comprising: creating rules for interpreting the symbolic activity using context data and historical data associated with the given environment.

19. The one or more computer-readable storage media of claim 17 having further computer-executable instructions comprising: sensing one or more physical objects within the given environment; and creating profiles for the one or more physical objects.

20. The one or more computer-readable storage media of claim 17 having further computer-executable instructions comprising: identifying one or more virtual objects within the given environment; and creating profiles for the one or more virtual objects.

* * * * *